E. G. WENTWORTH.
AUTOMATIC LIGHT CONTROLLER.
APPLICATION FILED JAN. 29, 1919.
1,319,818.  Patented Oct. 28, 1919.
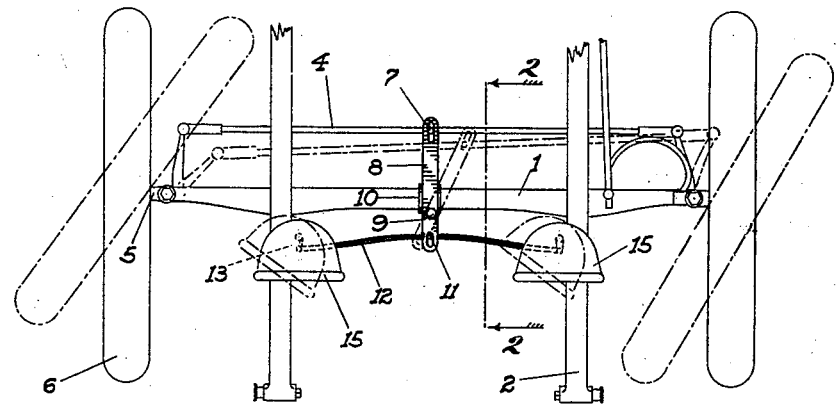
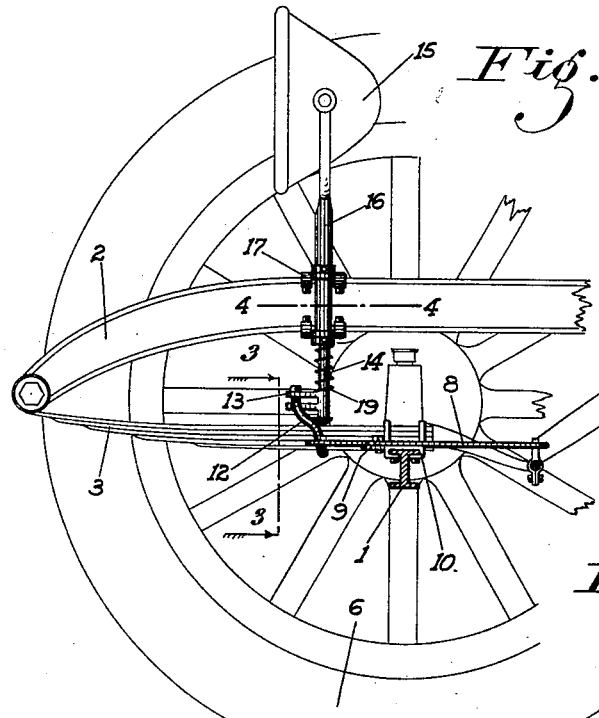
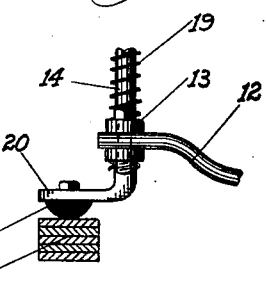
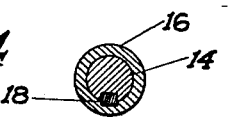
INVENTOR
Ernest G. Wentworth
BY
S. Webster
ATTORNEY

UNITED STATES PATENT OFFICE.

ERNEST G. WENTWORTH, OF SACRAMENTO, CALIFORNIA.

AUTOMATIC LIGHT-CONTROLLER.

1,319,818.  Specification of Letters Patent.  Patented Oct. 28, 1919.

Application filed January 29, 1919. Serial No. 273,712.

*To all whom it may concern:*

Be it known that I, ERNEST G. WENTWORTH, a citizen of the United States of America, residing at Sacramento, in the county of Sacramento and State of California, have invented certain new and useful Improvements in Automatic Light-Controllers; and I do declare the following to be a clear, full, and exact description of the same, reference being had to the accompanying drawings, and to the characters of reference marked thereon, which form a part of this application.

This invention relates to improvements in automatic light controllers for automobile headlights, the principal object of the invention being to produce a device by means of which the headlights of the automobile will turn to throw their rays at an angle to the car whenever the wheels of the car are turned to steer the same. This feature is of especial value when traveling at night in mountainous country where the highway winds around the hillside with one curve following another in rapid succession.

Owing to the recent improvement of the highways throughout the country, such travel is rapidly increasing and the road at curves is usually picked out by the driver's manipulation of an adjustable searchlight secured to one side of the windshield. This necessitates the continuous use of one hand of the driver to operate the searchlight at a time when he needs both hands to properly control and run the car.

By the installation of my device on a car, this objectionable feature is overcome and without any effort on the part of the driver the lights will turn to throw their rays on the curve to be taken, the amount of such turning being in direct proportion to the amount of turning of the wheels.

As a further object, I have produced a device which with slight modifications may be made adaptable for any make of automobile.

A still further object of the invention has been to provide a simple and inexpensive device and yet one which will be extremely efficient for the purpose for which it is designed.

These objects I accomplish by means of such structure and relative arrangement of the parts as will fully appear by a perusal of the following specification and claim.

On the drawings, similar characters of reference indicate corresponding parts in the several views.

Figure 1 is a top plan view of the front wheels of an automobile, showing my improved automatic light control means installed thereon.

Fig. 2 is an elevational view thereof taken on a line 2—2 of Fig. 1.

Fig. 3 is a fragmentary view taken on a line 3—3 of Fig. 2.

Fig. 4 is a fragmentary view taken on a line 4—4 of Fig. 2.

Referring now more particularly to the characters of reference on the drawings, the numeral 1 designates the front axle of the car, 2 the frame thereof and 3 the springs. 4 is the usual transverse steering knuckle connecting rod connected in the ordinary manner to the spindles 5 of the front wheels 6.

On the rod 4 central thereof is clamped a pin 7 slidable in one end of a lever 8 pivotally mounted as at 9 to a member 10 clamped to the axle 1, such clamping point being on the side of the axle farthest from the rod 4.

The end of the lever 8 beyond the pivotal point 9 thereof is adapted to receive a pin 11 projecting upwardly from a transverse rod 12 pivotally connected at its ends to arms 13 projecting at right angles from vertical spindles 14 operatively connected with the lights 15 of the car, which are turnably mounted on standards 16 in brackets 17 secured to the frames 2.

To allow for the difference in level between the rod 12 and its connected parts and the lights 15 when the car strikes a rut, etc., tending to flatten the springs 3, the standards 16 are hollow, the spindles 14 being slidable therein but being turnably connected to each standard by a feather key 18 secured to the spindles. A spring 19 is interposed on each spindle between the arm 13 and the bracket 17.

Positive motion to the spindles 14 relative to the amount of flattening of the springs 3 is given by an arm 20 projecting at right angles from each spindle below the arm 13, there being a bumper 21 of rubber or similar material resting on the spring 3 to deaden any sound resulting from the jarring contact of metal against metal.

The lever arm 8 is of course proportioned and constructed to turn the lights through arcs of the same degree of curvature as those made by the wheels 6 and to avoid any tendency of the steering rod 4 to bind by reason of the lamp turning parts connected thereto.

Thus, from the foregoing description it will readily be seen that I have produced such a device as substantially fulfils the objects of the invention as set forth herein.

While this specification sets forth in detail the present and preferred construction of the device, still in practice, such deviations from such detail may be resorted to as do not form a departure from the spirit of the invention, as defined by the appended claim.

Having thus described my invention, what I claim as new and useful and desire to secure by Letters Patent is:

In combination with lights mounted on standards turnable in brackets secured to the frame of a motor vehicle, rods slidable in the standards and turnable therewith, and arms projecting therefrom operatively connected to the steering knuckle connecting rod of the vehicle, a means whereby the difference in level between the connecting rod and the arms on the lamp rods occasioned by the flattening of the vehicle springs will be compensated for, such means including padded projections on the lamp rods adapted to impinge against the springs, there being coiled springs on the rods between the bracket and the arms whereby the projections on the rods will always maintain contact with the springs.

In testimony whereof I affix my signature in presence of two witnesses.

ERNEST G. WENTWORTH.

Witnesses:
 FRANK H. CARTER,
 BERNARD PRIVAT.

Copies of this patent may be obtained for five cents each, by addressing the "Commissioner of Patents, Washington, D. C."